No. 804,975.   
PATENTED NOV. 21, 1905.

H. H. PORTER, Jr.
TRANSFER APPARATUS.
APPLICATION FILED FEB. 19, 1902.

Witnesses  
Oscar A. Thelin  
Paul Carpenter

Inventor:  
Henry H. Porter, Jr.  
by Paul Synnestvedt  
atty

No. 804,975. PATENTED NOV. 21, 1905.
H. H. PORTER, Jr.
TRANSFER APPARATUS.
APPLICATION FILED FEB. 19, 1902.

Witnesses:
Oscar A. Thelin.
Paul Carpenter.

Inventor:
Henry H. Porter Jr
by Paul Synnestvedt
Atty

UNITED STATES PATENT OFFICE.

HENRY H. PORTER, JR., OF CHICAGO, ILLINOIS, ASSIGNOR TO SWANITZ COMPANY, OF CHICAGO, ILLINOIS, A CORPORATION OF DELAWARE.

TRANSFER APPARATUS.

No. 804,975. Specification of Letters Patent. Patented Nov. 21, 1905.

Application filed February 19, 1902. Serial No. 94,809.

*To all whom it may concern:*

Be it known that I, HENRY H. PORTER, Jr., a citizen of the United States, residing at Chicago, in the county of Cook and State of Illinois, have invented certain new and useful Improvements in Transfer Apparatus, of which the following is a specification.

This invention has reference to the provision of apparatus designed for use in the transfer of loads for short distances as in the handling of broken car lots in a ware house, or adjacent to a terminal station, and has for its principal object the combination with a transfer truck of a load supporting table, and means whereby said table may be carried around by said truck, and picked up and put down as required without any necessity of removing the load therefrom.

It has been heretofore proposed to use transfer apparatus comprising a platform provided with a plurality of stalls or recessed openings therein into which a carrying truck could be run and caused to deposit so as to rest upon the platform a load carrying board or truck body.

Another object of this invention is the provision of such a combination as is above set forth with which also are employed devices whereby said table may itself be pushed or moved around as a truck, said devices comprising primarily an arrangement of casters or wheels whereon said table is supported when not carried by the truck.

In carrying out my invention I provide an arrangement of apparatus which I have illustrated in the preferred form in the accompanying drawings in which Figure 1 is a side elevation showing my improved truck with the table in position thereon;

Figure 1:
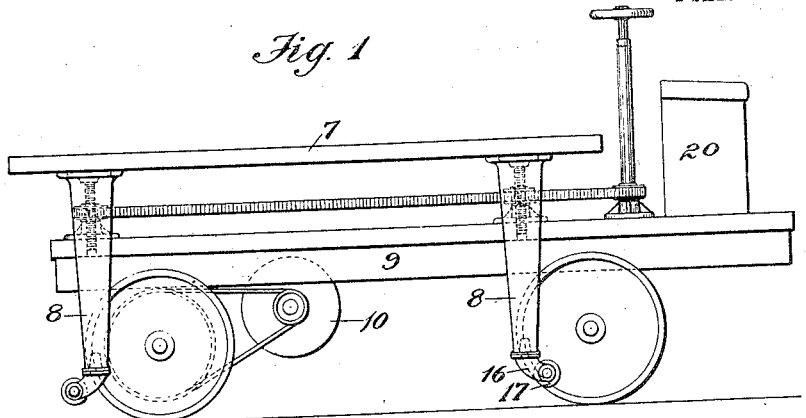
Figure 2:
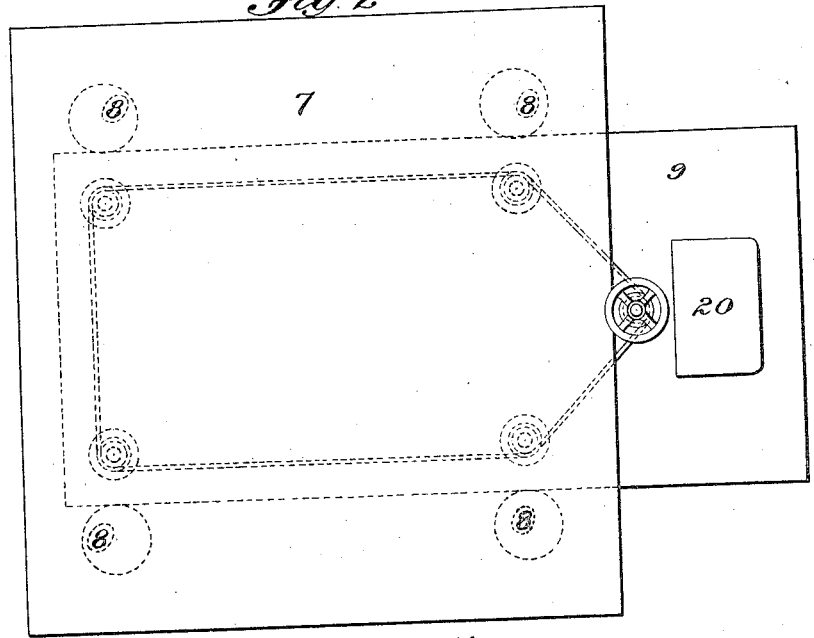
Figure 2 is a plan view of the same.
Figure 3:
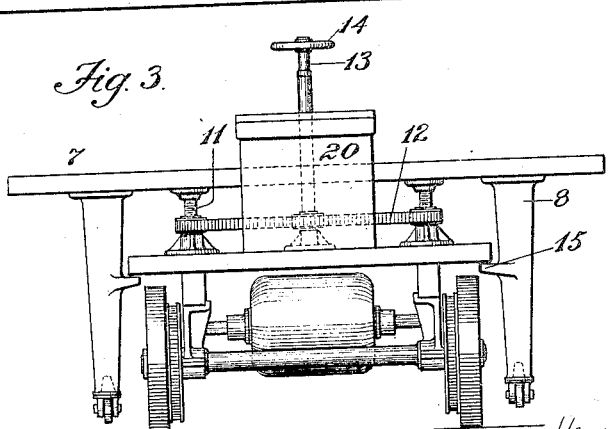
Figure 3 is an end elevation.

In carrying out my invention I provide first a load carrying table 7 which is preferably made about square as indicated in Figure 2 and the legs or supports 8 whereof are preferably located near the outer corners and spaced sufficiently far apart so that a carrying truck 9 can be run between them from any side.

The carrying truck 9 is preferably provided with some driving mechanism, as the motor indicated at 10, and a battery 20, and with means for raising up or letting down the load carrying table, such means being shown as consisting of four jack screws 11, having an endless chain 12 connected therewith on fixed sprockets thereon, to cause them to turn in unison and also in unison with the shaft 13, which is fixed on the truck and may be rotated by means of the wheel 14, or by any other suitable mechanism. The screws 11 turn in threaded supporting abutments fixed on the truck, and have head sockets to impinge against the table to raise it.

Adjacent to each of the legs 8, or in any other convenient location, I provide projecting arms or stops 15 designed to steady the table when it is raised in position to be supported by the carrying truck 9.

Upon the lower ends of the table legs I have shown casters 16 having wheels or rollers 17, so that when the table stands upon its legs it can be pushed or moved around with facility. It is obvious, however, that in place of the casters shown, wheels can be employed if desired, two or more of the same being so mounted as to be turned about a vertical axis by any suitable means, so as to serve as steering mechanism for the table when it is being moved upon its own wheels.

Figure 4:
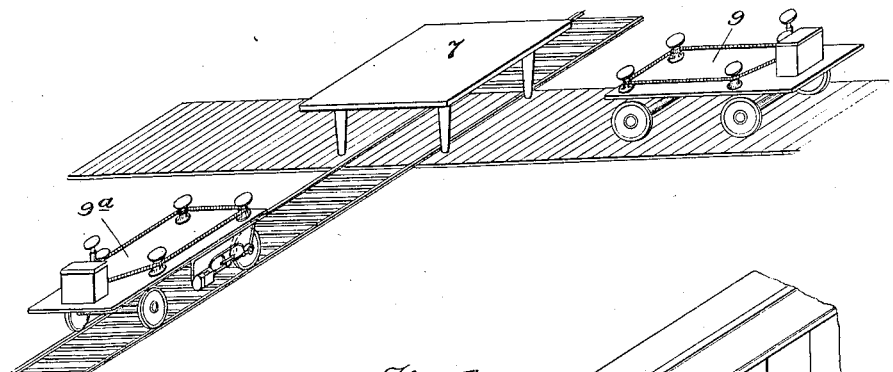
Figure 4 shows the method in which my improved apparatus is employed where it is desired to transfer the load carrying table from one truck to another, as for example from an automobile truck to a railroad car or truck.
Figure 5:
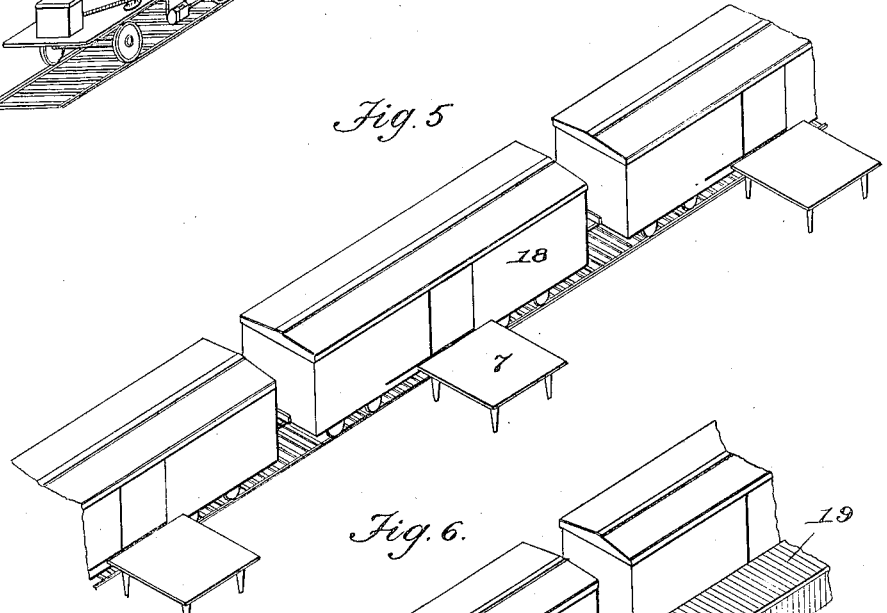
Figure 5 shows one of the tables placed adjacent to the door of a car ready for loading or unloading.
Figure 6:
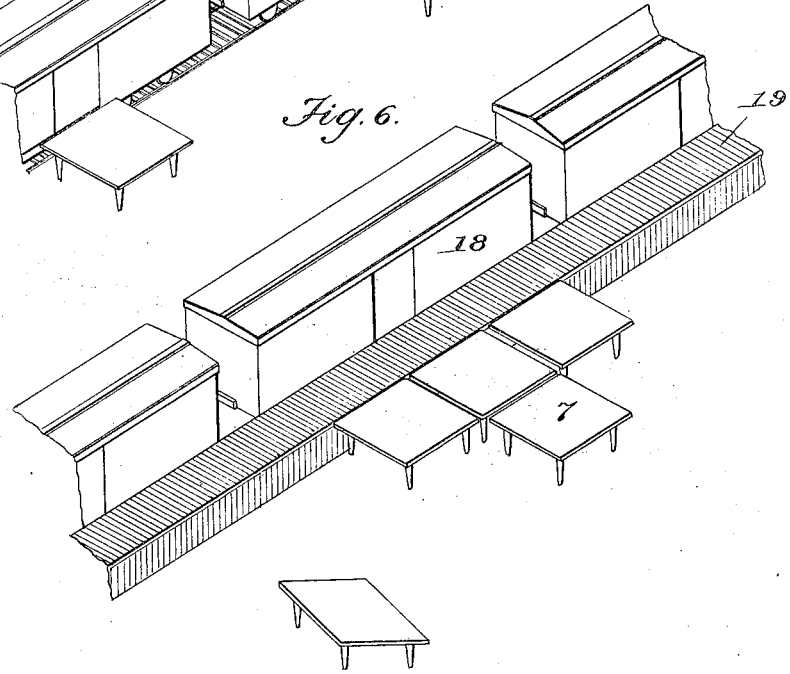
Figure 6 shows a plurality of the tables arranged along a loading platform upon the opposite side of which are some railroad cars.

The operation of my invention is as follows: Assuming that a car load of merchandise has been brought in to be unloaded, and that the car, 18, stands adjacent to a loading platform, 19, as shown in Figure 6, a plurality of my load carrying tables, 7, can be deposited alongside the platform, as shown in Figure 6, and loaded from the goods in the car. After a table is loaded a carrying truck can be run under it and the table lifted by means of the truck to take the weight of the same off its legs, when it can be moved to any point desired, and again deposited upon its own legs leaving the truck free to be used in transporting another table while the one first transported is being unloaded. The cars can be unloaded directly onto the table without the use of any intervening platform, as indicated in Figure 5, the table being placed immediately adjacent the car, or the goods carried by the table can be transferred without reloading, that is, table and all, from one truck to another, as for example from the automobile carrying truck 9 to the railroad car truck $9^a$ shown in Figure 4, by simply causing the automobile truck to deposit the table in the position shown in the figure astride the railroad track and then running the automobile truck out from under and the railroad car under and picking up the table upon the railroad car by means of the lifting mechanism with which it is provided.

While I have herein shown an arrangement of jack screws connected by a chain as a lifting mechanism for raising and lowering the tables, it is obvious that other devices quite different in detail from those shown can be used if preferred. It is also obvious that the lifting mechanism could if desired be mounted upon the tables instead of upon the trucks, although I prefer to have the lifting mechanism carried by the trucks.

By the improvements above set forth it is clear that where a large amount of merchandise is to be transferred, as for example in a railway freight house, and loaded and unloaded from and into different cars, a great many load carrying tables can be employed and handled by the use of but a very limited number of trucks, it being possible in this manner to handle with facility upward of say, one hundred tables by the use of only half a dozen trucks, which reduces materially not only the cost of the apparatus, but the expense of maintenance and the cost for labor in operating the devices. The trucks and men operating the same need not be detained while the loading and unloading is taking place, which leaves them free to be carrying other tables from place to place during such time.

Loaded tables may be set at one side or stored, in any ordinary storage place, without removing the goods from the tables, therefore obviating the necessity of rehandling.

Having thus described my invention, what I claim as new, and desire to secure by Letters Patent, is—

1. In transfer apparatus the combination of a movable load carrying table, a movable truck for moving said table, means on the truck whereby the truck may be run under the table and the table lifted thereby, said truck and table each being provided with wheels by which the same may be moved in any direction.

2. In transfer apparatus the combination with a movable table having legs with casters, of a truck provided with driving wheels thereon and means for running under the said table and lifting the same out of contact with the floor and holding it on the truck, the truck and table being adapted to move in any direction and the table to be readily let down and raised in any desired position.

3. In transfer apparatus in combination with a movable table adapted to be raised and lowered thereon, a portable truck provided with mechanically driven wheels and a motor for driving the same, having a plurality of vertically movable abutments designed to raise said table and means to hold it permanently in place on the said truck, all said movable abutments being operated by a single actuating element, substantially as described.

4. In transfer apparatus in combination with a traction truck for moving the same, a table having a plain top with unobstructed space between the legs of the table, said legs of the table being provided with projections to engage the top of the truck and hold the same steady when by means of the truck the table is raised off the ground, and said table being provided with casters.

5. In transfer apparatus, in combination with a portable table having inwardly projecting spurs upon the legs thereof, a truck having a stationary top and provided with a plurality of vertically movable abutments upon said top with means for raising all said abutments simultaneously, whereby the said table may be raised and the projections on the legs of the table brought into contact with the top of the truck in order to hold the table securely upon the truck, substantially as described.

6. In transfer apparatus the combination with a portable table, a movable motor driven truck provided with a fixed platform and above said platform a plurality of vertically moving screw jacks all which are driven by a sprocket chain from a central actuating shaft, substantially as described.

H. H. PORTER, Jr.

Witnesses:
PAUL SYNNESTVEDT,
H. W. SMALLEY.